United States Patent
Stayton et al.

(10) Patent No.: US 7,786,922 B2
(45) Date of Patent: Aug. 31, 2010

(54) SYSTEMS AND METHODS EMPLOYING ACTIVE TCAS TO ENHANCE SITUATIONAL AWARENESS

(75) Inventors: Gregory T. Stayton, Peoria, AZ (US); Michael F. Tremose, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 0 days.

(21) Appl. No.: 11/945,869

(22) Filed: Nov. 27, 2007

(65) Prior Publication Data

US 2008/0158040 A1 Jul. 3, 2008

Related U.S. Application Data

(60) Provisional application No. 60/861,394, filed on Nov. 27, 2006.

(51) Int. Cl.
*G01S 13/93* (2006.01)
(52) U.S. Cl. .............................. 342/30; 342/32; 342/37; 342/44
(58) Field of Classification Search .................... 342/30
See application file for complete search history.

(56) References Cited

U.S. PATENT DOCUMENTS

| | | | | |
|---|---|---|---|---|
| 4,599,617 A | * | 7/1986 | Stolpman | 342/48 |
| 4,855,748 A | * | 8/1989 | Brandao et al. | 342/455 |
| 4,914,733 A | * | 4/1990 | Gralnick | 340/961 |
| 5,008,844 A | * | 4/1991 | Kyriakos et al. | 702/106 |
| 5,208,591 A | * | 5/1993 | Ybarra et al. | 340/961 |
| 5,235,336 A | * | 8/1993 | Sturm et al. | 342/30 |
| 5,572,214 A | * | 11/1996 | Ringel | 342/169 |
| 6,169,519 B1 | * | 1/2001 | Holecek et al. | 342/442 |
| 6,208,284 B1 | * | 3/2001 | Woodell et al. | 342/30 |
| 6,211,810 B1 | * | 4/2001 | Schirf | 342/36 |
| 6,271,768 B1 | * | 8/2001 | Frazier et al. | 340/961 |
| 6,285,313 B1 | * | 9/2001 | Wahab et al. | 342/174 |
| 6,313,783 B1 | * | 11/2001 | Kuntman et al. | 342/32 |
| 6,384,783 B1 | | 5/2002 | Smith et al. | |
| 6,392,598 B1 | * | 5/2002 | Jones et al. | 342/442 |
| 6,531,978 B2 | * | 3/2003 | Tran | 342/29 |
| 6,646,588 B2 | * | 11/2003 | Tran | 342/29 |

(Continued)

OTHER PUBLICATIONS

Helfrick, A.: "Principles of Avionics"; Avionics Communications, Inc.; 2004, pp. 174, 199, 201, 202; XP007904696.

*Primary Examiner*—Thomas H Tarcza
*Assistant Examiner*—Matthew M Barker
(74) *Attorney, Agent, or Firm*—Allen J. Moss; Alex Starkovich; Squire, Sanders & Dempsey L.L.P.

(57) ABSTRACT

A method according to the present invention includes transmitting a Mode S interrogation and receiving a response from an aircraft that has received the Mode S interrogation. A range to the aircraft is determined based on a time period between transmitting the Mode S interrogation and receiving the response. The method further includes receiving information from one or more data sources and determining at least one of a bearing to the aircraft and a position of the aircraft using the determined range and the information from the one or more data sources. Information can be received from any number (or type) of data sources, such as ADS-B-equipped aircraft.

12 Claims, 6 Drawing Sheets

U.S. PATENT DOCUMENTS

| | | |
|---|---|---|
| 7,248,219 B2 * | 7/2007 | Smith et al. ................. 342/456 |
| 2002/0011950 A1 * | 1/2002 | Frazier et al. .......... 342/357.08 |
| 2002/0021247 A1 | 2/2002 | Alexander et al. |
| 2002/0080059 A1 * | 6/2002 | Tran ............................ 342/29 |
| 2003/0233192 A1 * | 12/2003 | Bayh et al. .................. 701/301 |
| 2005/0156777 A1 | 7/2005 | King et al. |
| 2006/0119515 A1 * | 6/2006 | Smith ......................... 342/450 |
| 2007/0080848 A1 * | 4/2007 | Stone et al. ................... 342/30 |

* cited by examiner

SYSTEMS AND METHODS EMPLOYING ACTIVE TCAS TO ENHANCE SITUATIONAL AWARENESS

CROSS-REFERENCE TO RELATED APPLICATION

This application claims priority to U.S. Provisional Patent Application Ser. No. 60/861,394, filed Nov. 27, 2006, the disclosure of which is incorporated by reference in its entirety.

DESCRIPTION OF THE INVENTION

1. Field of the Invention

The present invention relates to systems and methods employing active TCAS to enhance situational awareness.

2. Background of the Invention

The current high volume of air vehicle traffic at airports around the world creates the potential for collisions between aircraft in the air and on the ground. Many airports face the challenging task of handling hundreds (or even thousands) of takeoffs and landings per day, often using just a handful of runways. In such crowded conditions, there is a significant danger of aircraft colliding with each other (or with other vehicles) due to a lack of situational awareness.

Some aircraft are equipped with Automatic Dependent System Broadcast (ADS-B) systems that automatically and repeatedly broadcast the aircraft's position, velocity, flight identification, and other parameters. ADS-B systems are generally equipped with Global Positioning Systems (GPS) to allow the aircraft to determine and broadcast its position accurately. The United States Federal Aviation Administration (FAA) has mandated that ADS-B systems must be included on all aircraft by 2020 to allow the position and movement of aircraft to be tracked in order to help avoid collisions at an airport or other location. Until that time, however, aircraft are not required to use ADS-B systems, and there is no current system that can accurately determine the position of non-ADS-B-equipped aircraft to provide situational awareness and help avoid collisions in an airport or other environment.

Currently, non-ADS-B-equipped aircraft are equipped with either a Mode S transponder or an Air Traffic Control Radar Beacon System (ATCRBS) transponder. Such transponders broadcast the altitude and other statistics for the aircraft, but only in response to a Mode S interrogation specifically directed to the Mode S transponder or an all-call interrogation soliciting replies from the ATCRBS transponder. An aircraft with a Traffic Collision Avoidance System (TCAS) can determine a range to a non-ADS-B-equipped aircraft (that is equipped with a Mode S transponder) by transmitting a Mode S interrogation and analyzing the time period between the transmission and when it receives a response from the non-ADS-B-equipped aircraft. However, this determined range can be significantly inaccurate (i.e. by 200 feet or more) due in part to the lack of synchronization between the range clocks in the TCAS-equipped aircraft and the non-ADS-B-equipped aircraft.

In addition to determining a range to a non-ADS-B-equipped aircraft, a TCAS-equipped aircraft can also determine a bearing based on the phase or amplitude ratiometric measurements of the response signal measured by the antenna and bearing processor of the TCAS-equipped aircraft, however this determined bearing can be significantly inaccurate. Antenna sensitivity, obstructions, and the reflection of the signal off of the ground or objects can render the determination of the bearing inaccurate by thirty degrees or more.

These and other issues are addressed by the present invention.

SUMMARY OF THE INVENTION

One method according to the present invention includes transmitting a Mode S interrogation and receiving a response from an aircraft that has received the Mode S interrogation. A range to the aircraft is determined based on a time period between transmitting the Mode S interrogation and receiving the response. The method further includes receiving information from one or more data sources and determining at least one of a bearing to the aircraft and a position of the aircraft using the determined range and the information from the one or more data sources. Information can be received from any number (or type) of data sources, such as ADS-B-equipped aircraft.

A system according to aspects of the present invention includes a processor, a Mode S transceiver, a data transceiver, and a memory coupled to the processor. Those of skill in the art understand that either of the transceivers referenced herein may comprise a separate receiver and transmitter, or both a combined receiver and transmitter, and may receive and/or transmit electrical signals, radio frequency signals, modulated light signals, sonic signals, or other signals propagated through any suitable medium. The processor executes instructions stored in the memory to transmit a Mode S interrogation using the Mode S transceiver, receive a response through the Mode S transceiver from an aircraft that has received the Mode S interrogation, and determine a range to the aircraft based on a time period between transmitting the Mode S interrogation and receiving the response. The system can also receive information regarding the aircraft from one or more data sources through the data transceiver, and determine at least one of a bearing to the aircraft and a position of the aircraft using the determined range and the information from the one or more data sources. The system may further include a user interface (such as a Cockpit Display of Traffic Information or "CDTI") to describe the position of the aircraft to a user.

Another method according to various aspects of the present invention includes transmitting a plurality of Mode S interrogations and receiving a respective plurality of responses to the plurality of Mode S interrogations from an aircraft that has received the plurality of Mode S interrogations. The method further includes determining a plurality of computed ranges to the aircraft, wherein each one of the plurality of ranges is based on a time period between each of the transmitted Mode S interrogations and the receipt of the respective responses. The method determines the range to the aircraft based on the plurality of computed ranges to the aircraft.

Another system according to various aspects of the present invention includes a processor, a Mode S transceiver, a data transceiver, and a memory coupled to the processor. Those of skill in the art understand that either of the transceivers referenced herein may comprise a separate receiver and transmitter, or a combined receiver and transmitter, and may receive and/or transmit electrical signals, radio frequency signals, modulated light signals, sonic signals, or other signals propagated through any suitable medium. The processor executes instructions in the memory to transmit a plurality of Mode S interrogations using the Mode S transceiver and receive a respective plurality of responses to the plurality of Mode S interrogations through the Mode S transceiver from an aircraft that has received the plurality of Mode S interrogations. The processor further executes instructions in the memory to determine a plurality of computed ranges to the aircraft, wherein each one of the plurality of ranges is based on a time period between each of the transmitted Mode S interrogations and the receipt of the respective responses. The range to the aircraft is determined based on the plurality of computed ranges to the aircraft.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DESCRIPTION OF THE EMBODIMENTS

Reference will now be made in detail to the present exemplary embodiments of the invention, examples of which are illustrated in the accompanying drawings.

Figure 1:
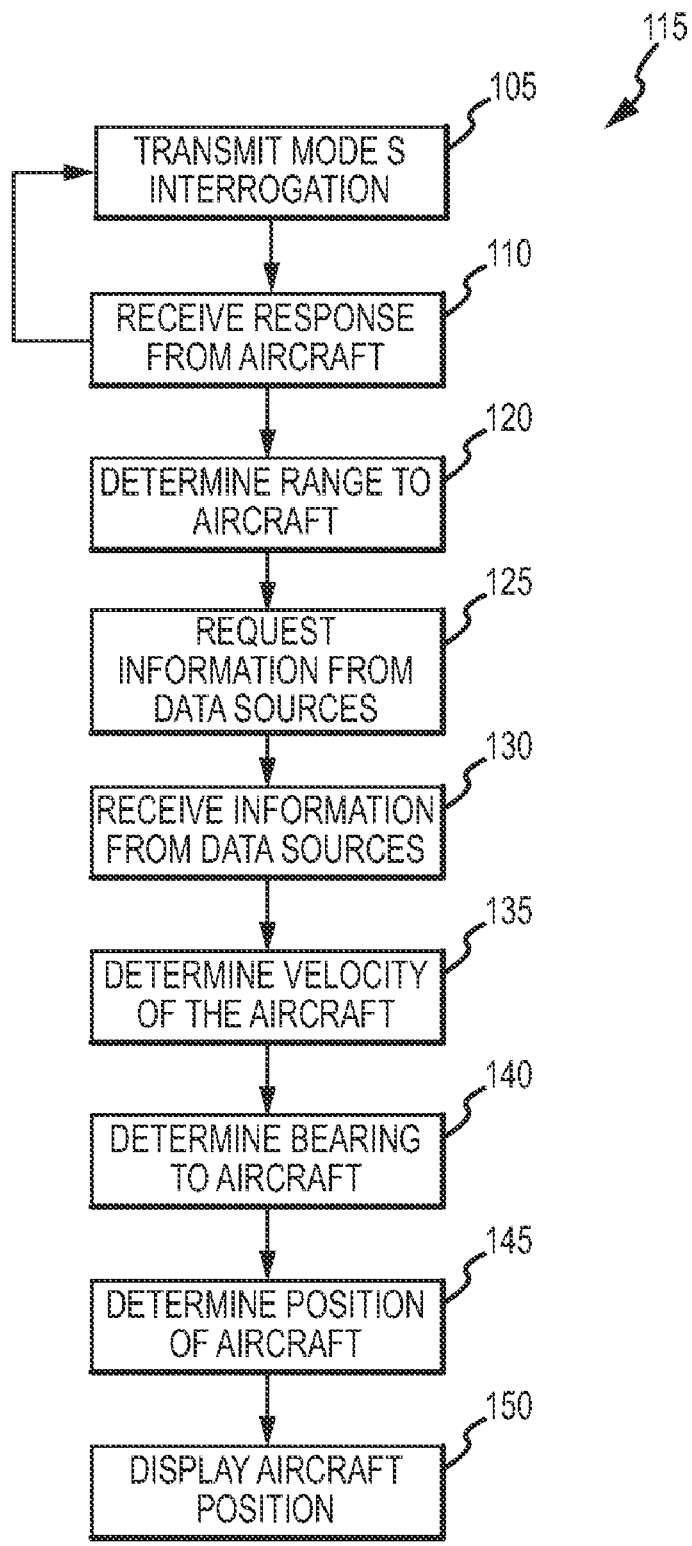
FIG. 1 is a flow diagram of an exemplary method according to various aspects of the present invention.

FIG. 1 depicts an exemplary process according to various aspects of the present invention. In this exemplary process, a Mode S interrogation is transmitted (105) and a response is received (110) from an aircraft that has received the Mode S interrogation and a range to the aircraft is determined (120). Information from one or more data sources may be requested (125) and received (130). Alternatively, such information may be received from one or more data sources without having made a request therefore (i.e. —the information may be regularly broadcasted). The velocity (135), bearing (140), and position (145) of the aircraft may also be determined. The position of the aircraft is displayed (150) to enhance the situational awareness of a pilot or other user.

Mode S Interrogation and Response

Figure 2:
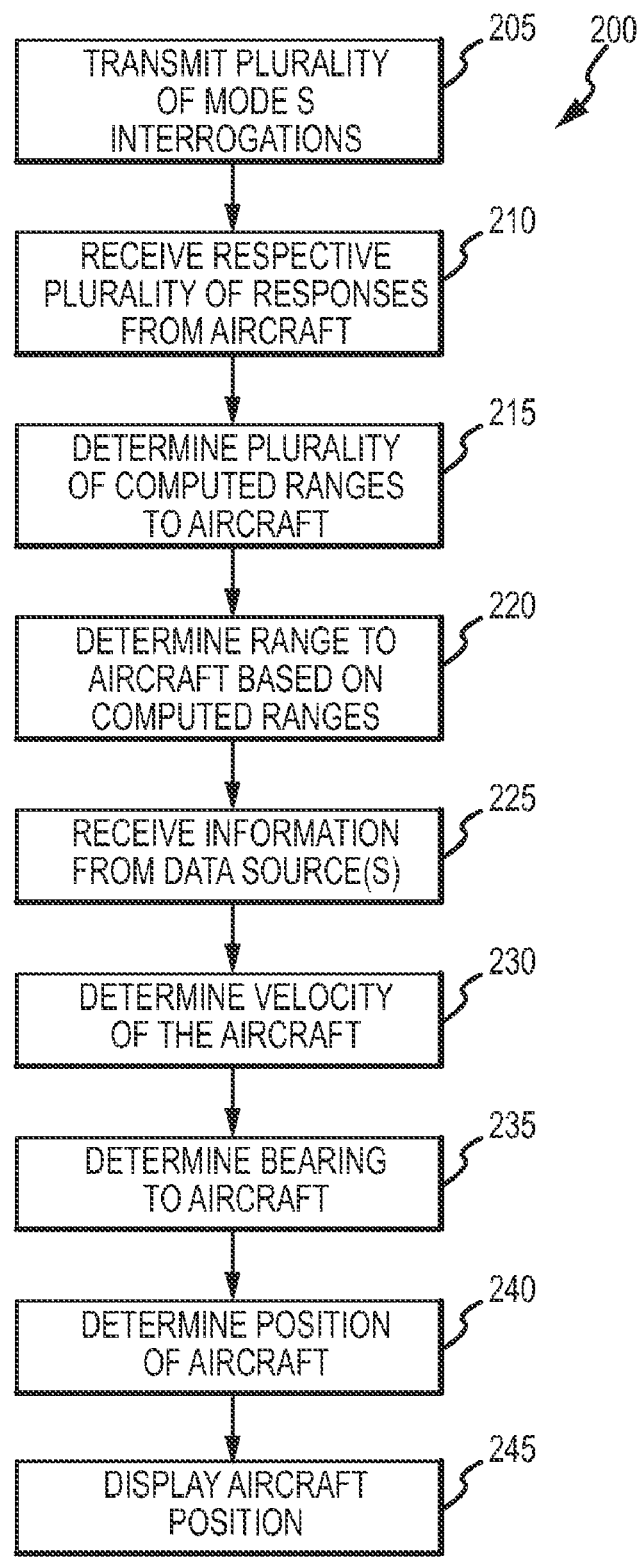
FIG. 2 is a flow diagram of another exemplary method according to various aspects of the present invention

As illustrated in FIG. 1, a Mode S transponder aboard an aircraft broadcasts a response (110) when it receives a transmitted interrogation (105) addressed to the transponder. The interrogation includes a code unique to the addressed transponder so that other Mode S transponders do not also respond to the interrogation. The response from a transponder aboard an aircraft can include the aircraft's altitude, as well as other data. The transmission of an interrogation and the receipt of a response may be repeated multiple times (115) for any desired purpose. Referring to FIG. 2, for example, a plurality of Mode S interrogations are transmitted (205) and a respective plurality of responses received (210) in order to determine a plurality of computed ranges (215) and determine a range to the aircraft based on the plurality of ranges (220), as will be discussed in more detail below.

Any number of Mode S interrogations can be addressed to any number of vehicles (such as an aircraft) or other entity utilizing a Mode S transponder. The Mode S interrogation and response may be transmitted and received on any suitable frequency or combination of frequencies. The interrogation and respective response need not use the same frequency. For example, the Mode S interrogation may be transmitted on one frequency (e.g. —1030 MHz) while the response may be broadcast on another frequency (e.g. —1090 MHz).

Range Determination

A range to an aircraft responding to a Mode S interrogation can be determined (120) based on the time period between the transmission of the interrogation and the receipt of the response. Mode S transponders respond to an interrogation after a fixed period of time from when the transponder receives the interrogation (e.g. —128 μs). The interrogation signal and reply signal both travel at the speed of light. A computed range to the aircraft can thus be determined by measuring the time period between when the Mode S interrogation is transmitted and when the response is received from an aircraft (and accounting for a fixed response time of the transponder, such as 128 μs).

Figure 3:
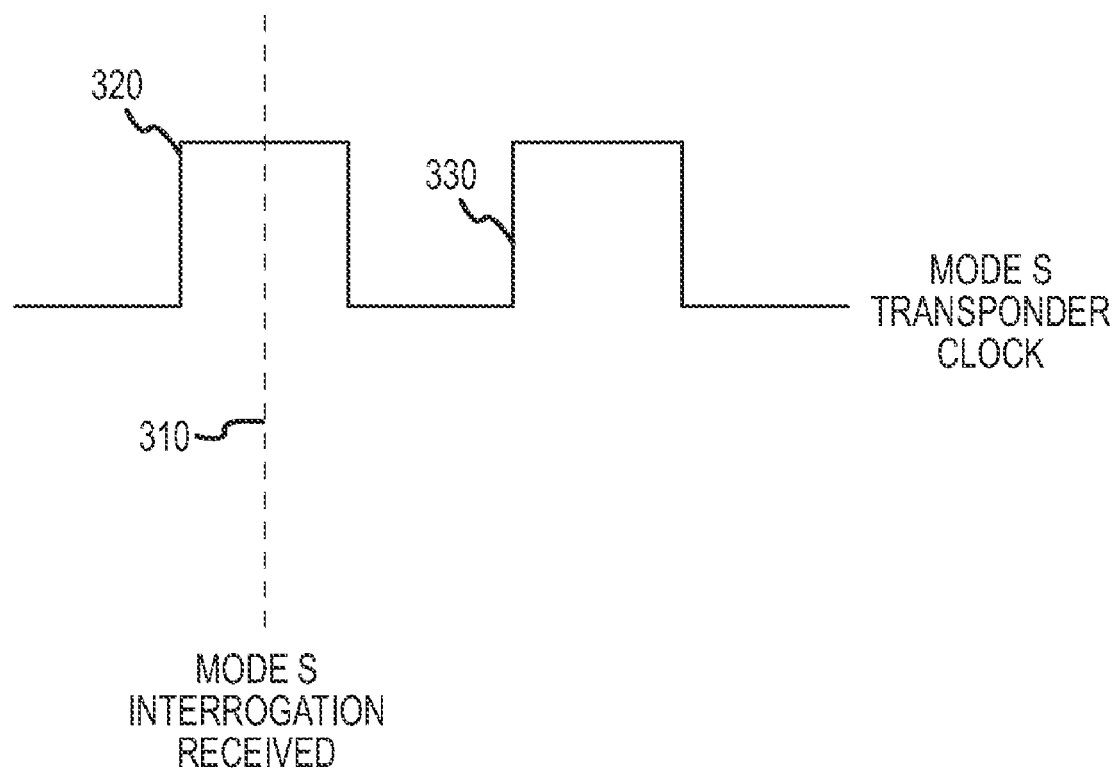
FIG. 3 is a timing diagram illustrating the asynchronization between the clock of a Mode S transponder and the clock of a Mode S interrogator.

The clock of any system or device implementing methods in accordance with the present invention that broadcasts the Mode S interrogation may not necessarily be in synch with the clock in a Mode S transponder responding to the interrogation. The Mode S interrogation includes a sync phase reversal (SPR) field that allows the Mode S transponder receiving the interrogation to synchronize its clock with the clock of the system or device broadcasting the interrogation, which can take up to a full clock cycle depending on when the SPR is recognized by the transponder. The asynchronization of the transponder clock with that of the system or device broadcasting the interrogation can introduce error in determining the range to the aircraft carrying the Mode S transponder by up to a full cycle of the Mode S transponder's clock. For example, referring to FIG. 3, where the Mode S interrogation is received by a Mode S transponder (310) after the start of the transponder's clock cycle (320), the transponder will not be able to synchronize its clock with that of the system or device broadcasting the interrogation until the start of the next clock cycle (330). This added time period (the period of time between when the interrogation is received 310 and the start of the next clock cycle 330) has the effect of introducing error to the determined range to the aircraft (i.e. —making the determined range larger).

In accordance with the present invention, the amount of potential error can be reduced by increasing the speed of the clock in the Mode S transponder (thus decreasing the amount of time between clock cycles). However, there may be limitations on the maximum speed of the transponder clock, particularly in existing systems. Referring to FIG. 2, methods and systems according to the present invention can further reduce the range error associated with clock asynchronization by transmitting a plurality of Mode S interrogations (205), receiving a respective plurality of responses (210), and determining a plurality of ranges to the aircraft (215). Each of the plurality of ranges is, as discussed above, based on the time period between when each Mode S interrogation is transmitted and when the respective response is received. The range to the aircraft is then determined based on the plurality of computed ranges (220). For example, in one embodiment of the present invention, the smallest (minimum) computed range from the plurality of ranges is selected as the range to the aircraft. The minimum range can be selected as being indicative of the interrogation/response pair that was received by the Mode S transponder closest to the start of the transponder's clock cycle. Other computed ranges (or combinations of computed ranges) from the plurality of computed ranges can be selected or used in any desired formula (or combination of formulas) to determine the range to the aircraft. For example, the range to the aircraft may be determined from averaging the plurality of computed ranges 220 together.

The range to the aircraft broadcasting the response to the Mode S interrogation can be determined using any other desired information, such as information from one or more data sources, as discussed below. For example, the movement of a system broadcasting the Mode S interrogation and/or of the aircraft responding to the interrogation may be considered in determining which of the plurality of ranges is the smallest.

Request and Receipt of Information from Data Sources

In the exemplary process depicted in FIG. 1, information can be requested (125) and received (130) from one or more data sources. As used herein, a "data source" refers to any person, system, device, vehicle, or other entity capable of providing information for use with systems and methods of the present invention. A data source may include one or more systems or devices implementing methods in accordance with the present invention. Information from a data source may be of any type and in any format. Information from data sources can be used to determine information, such as any spatial information (e.g., bearing, range, position, velocity) for a non-ADS-B equipped aircraft, as well as for other purposes. For example, information from a data source may include a range between an aircraft responding to a Mode S interrogation and one or more of the data sources, a bearing to the aircraft responding to a Mode S interrogation from one or more of the data sources, a position of one or more of the data sources, a velocity of one or more of the data sources, and/or an identifier for one or more of the data sources.

Information can be requested from a data source in accordance with the present invention. Specific information can be requested from a data source in order to, for example, save time and bandwidth by avoiding the transmittal of irrelevant or extraneous information by a data source. A data source can also provide a fixed or standardized set of information in response to a request.

A data source may also provide information at regular intervals and/or in response to an event, regardless of whether the information has been requested. For example, a data source such as an ADS-B-equipped system (e.g., an aircraft, ground vehicle, waterborne vehicle, or a fixed ground station) that detects the presence of a non-ADS-B-equipped aircraft within a predetermined volume may automatically broadcast information regarding the non-ADS-B-equipped aircraft. Any suitable predetermined volume can be used and may be bounded in any desired manner. For example, a predetermined volume can be bounded by one or more dimensions measured from a distance from a vehicle, a distance from the one or more data sources, a distance from a fixed geographical location, and combinations thereof. The predetermined volume can be specified by systems and methods operating in accordance with the present invention, by the data source itself, or by any other suitable entity. A data source can restrict the broadcast of information where a non-ADS-B-equipped aircraft is in a predetermined volume in order to reduce the amount of overall information being transmitted, which can be considerable in areas with heavy air traffic, such as airports.

A data source may provide information in any suitable manner. For example, information can be provided wirelessly from a data source to a system or device implementing methods in accordance with the present invention. Such information can be provided on any frequency (or combination of frequencies), in any format, and using any communication protocol. In an exemplary embodiment of the present invention, information from a data source comprising an ADS-B-equipped aircraft can be provided to another ADS-B-equipped aircraft via a wireless datalink. The datalink can utilize the Mode S transponder frequencies (i.e. 1030 MHz and 1090 MHz) as well as any other frequency. Systems and methods of the present invention may also transmit any desired information to any data source. This can allow multiple ADS-B-equipped aircraft to share information with each other regarding non-ADS-B-equipped aircraft.

Determination of Other Statistics

In addition to determining the range to a non-ADS-B-equipped aircraft, systems and methods according to the present invention may determine any other desired statistics regarding the aircraft, such as its velocity, heading, bearing, and/or position. Any other appropriate information can likewise be determined in order to enhance a user's situational awareness.

Systems and methods of the present invention can determine a bearing to a non-ADS-B-equipped aircraft based on the ratiometric amplitude of adjacent antenna beams and the direction from which a received response signal is the strongest. A position of the non-ADS-B-equipped aircraft can be determined based on the determined range and the determined bearing.

A velocity vector can also be determined for the non-ADS-B aircraft. In one exemplary embodiment of the present invention, a first Mode S interrogation and a second Mode S interrogation are transmitted and respective first and second responses received from a non-ADS-B-equipped aircraft. A first range is determined based on the time period between the transmission of the first Mode S interrogation and the receipt of the first response, and a second range is determined based on the time period between the transmission of the second Mode S interrogation and the receipt of the second response. A first bearing and a second bearing are determined, respectively, based on the strength and ratiometric direction of the first and second responses. A first position may then be determined based on the first range and first bearing, and a second position may be determined based on the second range and the second bearing. A velocity vector for the aircraft can be determined based on the difference between the first and second positions (i.e. —a change in the aircraft's position), as well as the elapsed time between the receipt of the first response and the second response (i.e. —the time in which the change in the aircraft's position occurred). Additionally, these and other statistics can be determined (or influenced by) based on information from one or more data sources.

Figure 4:
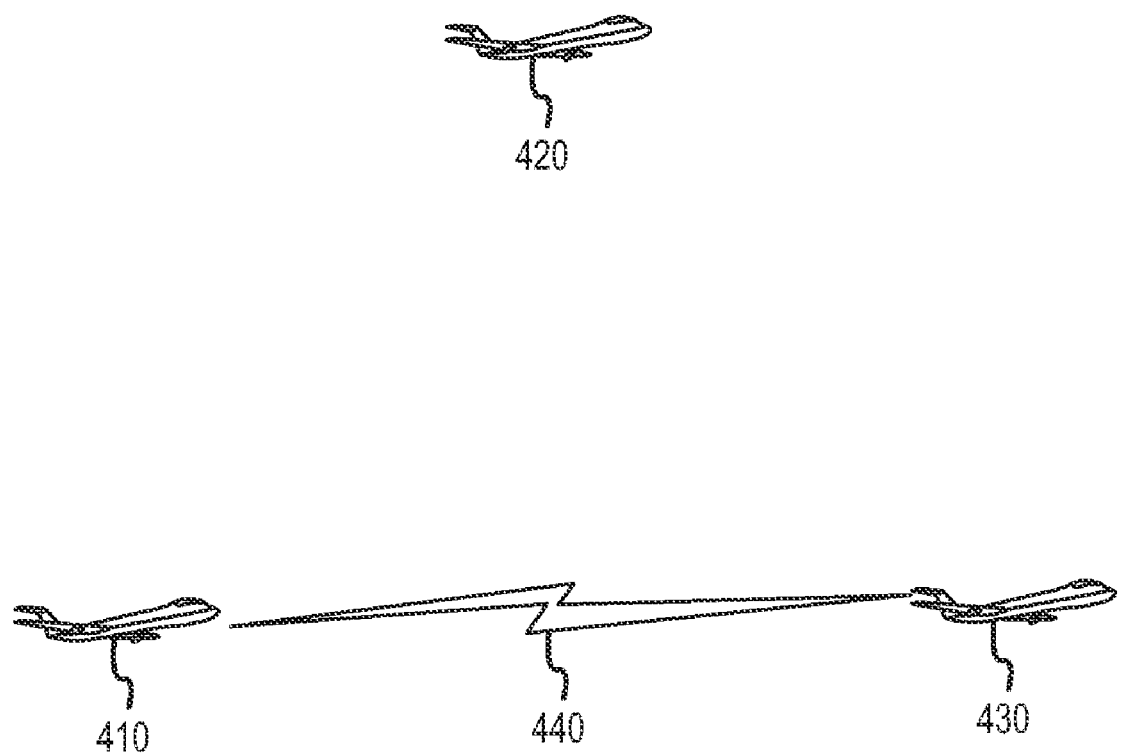
FIGS. 4 and 5 are diagrams illustrating the operation of various aspects of the present invention.

For example, as discussed previously, one or more data sources can provide information to systems and devices operating in conjunction with the present invention. In one exemplary embodiment of the present invention, referring now to FIG. 4, an ADS-B-equipped aircraft 410 determines a range, a position, and a velocity vector for a non-ADS-B-equipped aircraft 420. A data source (e.g., another ADS-B-equipped aircraft) 430 provides the first aircraft 410 with information over a wireless datalink 440, such as a range, a position, and a velocity vector for the non-ADS-B-equipped aircraft 420, as determined by the data source 430. The data source 430 may also provide information pertaining to the data source 430 itself (such as a position of the data source 430 measured by a GPS), as well as information regarding other data sources, vehicles, geographical features and locations, weather conditions, hazards, and/or any other desired information. In this way, the ADS-B-equipped aircraft 410 can calibrate the determined range, measured bearing, position, and velocity vector for the non-ADS-B-equipped aircraft 420 (as well as other statistics) to improve the accuracy of the measurements made by aircraft 410. For example, error associated with a measured bearing could be removed using a bearing calculated using GPS locations for aircraft 410 and aircraft 430, and measured bearings to aircraft 420 by aircraft 410 and aircraft 430. Removing the error from the measured bearing to aircraft 420 from aircraft 410 may also allow aircraft 410 to accurately calculate the position of aircraft 420 without needing to request additional data from aircraft 430 across the datalink 440.

Systems and methods of the present invention may utilize information regarding geographical features to help determine the position of a non-ADS-B-equipped aircraft, as well as other statistics. In this context, a "geographical feature" refers to any man-made or natural feature. Information regarding geographical features, as with other information utilized by the present invention, may be stored by systems and devices acting in accordance with the present invention and/or may be provided from any suitable data source. In one exemplary embodiment of the present invention, the geographical features of (and surrounding) an airport (e.g. —runways, terminals, structures, and undeveloped land) can be correlated with a determined position to verify that the determined position for the aircraft is on valid terrain, such as a runway, taxiway, ramp, gate, or other valid airport surface. If the determined position puts the aircraft on an invalid surface (such as in a swamp next to the airport), the position can be re-evaluated to determine a valid position for the aircraft.

Figure 5:
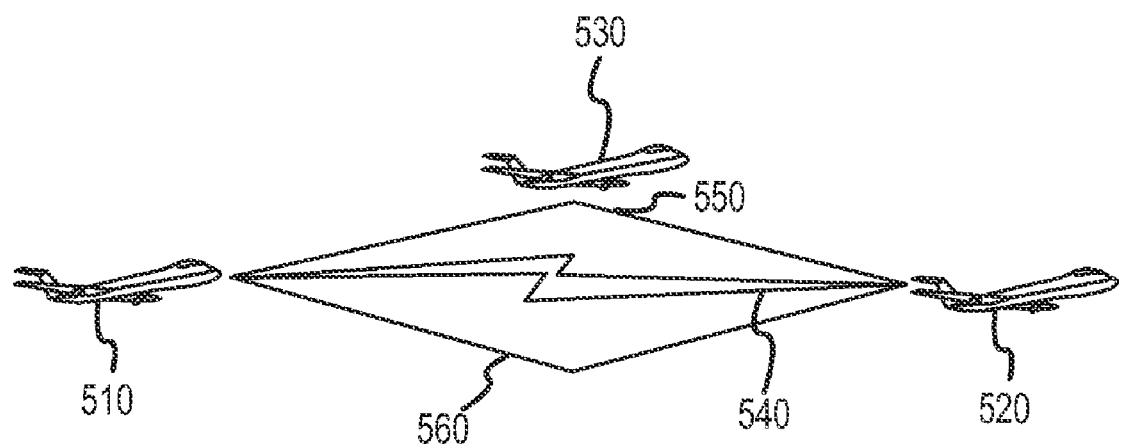

Any suitable number of data sources may provide information to systems and methods of the present invention to determine accurate statistics. In some cases, (such as where only a single data source is available to provide information to determine the position of a non-ADS-B-aircraft), the exact position of the aircraft may be difficult to determine within a desired range of error. For example, referring to FIG. 5, a first ADS-B-equipped aircraft 510 and a second ADS-B-equipped aircraft 520 each determine the range, bearing, and position to a third, non-ADS-B-equipped, aircraft 530 and share their respective determined statistics over a wireless datalink 540. Due to the range of error for the determined bearing and ranges by the first aircraft 510 and second aircraft 520, it may not be possible to tell which of the two intersection points 550, 560, is the actual position of the third aircraft 530 based on the range and bearing determinations alone. Accordingly, a velocity vector for the third aircraft 530 may be determined and used to exclude the intersection point that is inconsistent with the third aircraft's 530 heading and speed. Additionally, information regarding geographical features can be used to select the position of the third aircraft 530, such as by excluding an intersection point that would put the third aircraft 530 in an invalid location (e.g., on a mountain or in a swamp next to an airport).

Exemplary System

Figure 6:
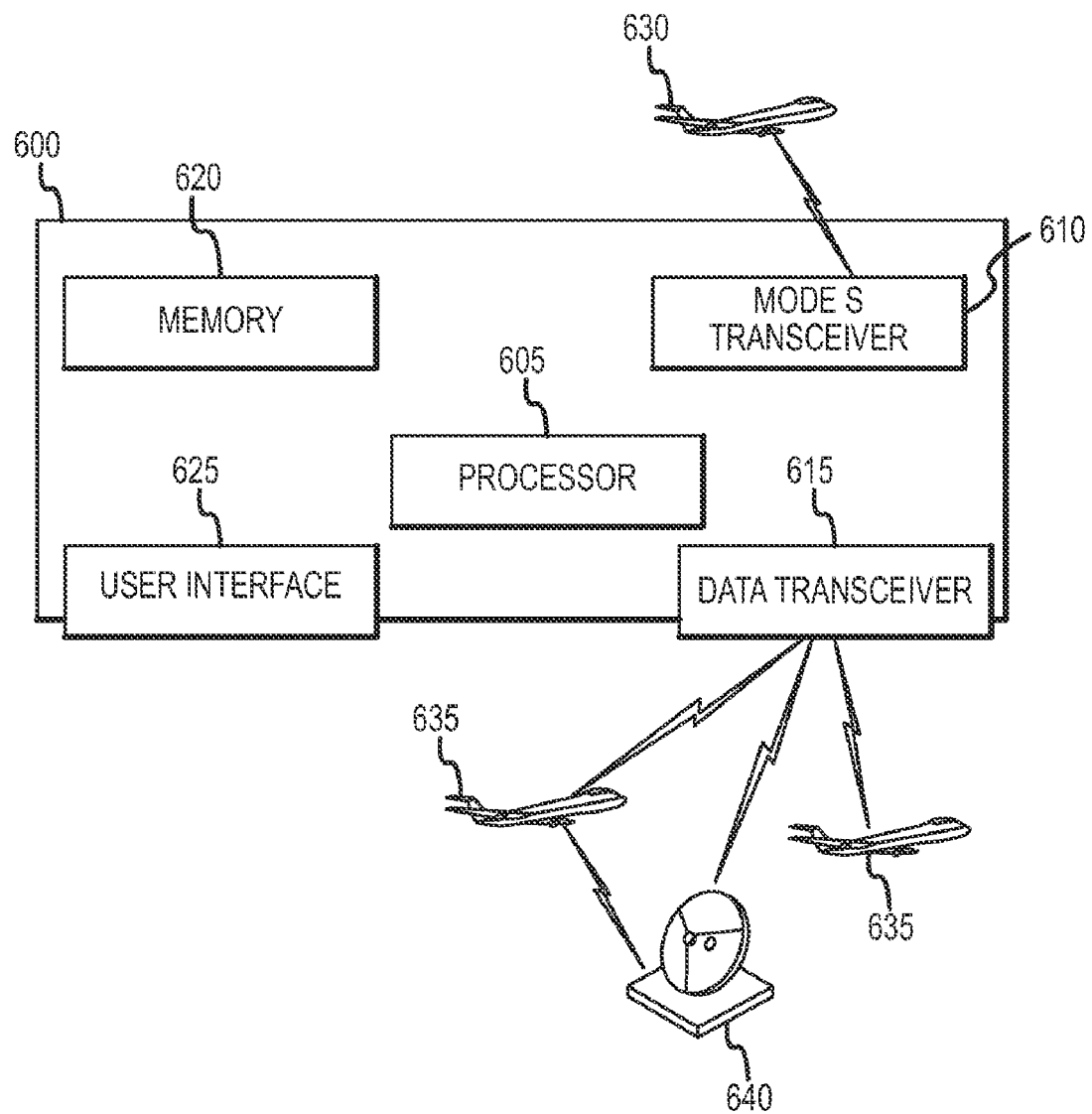
FIG. 6 is a block diagram of an exemplary system according to various aspects of the present invention.

FIG. 6 depicts an exemplary system according to various aspects of the present invention. The system 600 includes a processor 605 in communication with a Mode S transceiver 610, a data transceiver 615, a memory 620, and a user interface 625. The Mode S transceiver 610 and data transceiver 615 transmit and receive data through one or more antennas (not shown). The system 600 may operate as part of, or in conjunction with, any number of other systems and devices, such as a TCAS. The components of the exemplary system 600 may be distributed across any number of different systems and devices, and need not be physically connected to each other. The components of the system 600 may communicate with each other as desired, as well as with any other system or device. The system 600 may additionally include (or communicate with) any other appropriate components.

The processor 605 retrieves and executes instructions stored in the memory 620 to control the operation of the system 600. Any number and type of processor(s) such as an integrated circuit microprocessor, microcontroller, and/or digital signal processor (DSP), can be used in conjunction with the present invention.

The Mode S transceiver 610 transmits Mode S interrogations and receives responses from aircraft 630 that receives the Mode S interrogations (and to whom the interrogations are addressed). The Mode S transceiver 610 may be included in a TCAS system or other system. The Mode S transceiver 610 may transmit and receive using any appropriate frequency, and may use any desired communication protocol. For example, the Mode S transceiver may transmit Mode S interrogations at a frequency of 1030 MHz and receive responses at 1090 MHz.

The data transceiver 615 communicates with one or more data sources, such as an ADS-B-equipped aircraft 635 or a groundstation 640. The data transceiver 615 may comprise any suitable transceiver and may communicate using any number of frequencies and may use any communication protocol. The data transceiver 615 may be separate from the Mode S transceiver 610 (as shown in FIG. 6). Alternatively, the Mode S transceiver 610 may perform the functionality of the data transceiver 615. In one embodiment of the present invention, for example, the Mode S transceiver 610 may communicate with a data source using the 1090 MHz channel for Mode S responses.

The memory 620 stores instructions, information received from one or more data sources, and any other suitable information. The memory 620 operating in conjunction with the present invention may include any combination of different memory storage devices, such as hard drives, random access memory (RAM), read only memory (ROM), FLASH memory, or any other type of volatile and/or nonvolatile memory. Any number of memory storage devices of any size and configuration may also be used in conjunction with the present invention.

The user interface 625 receives input from, and displays output to, one or more users. The user interface 625 may include any number of suitable systems or devices to display information and receive various inputs. The user interface 625 may include one or more visual displays and/or speakers to communicate information to a user. A user can provide input to the user interface 625 through a mouse, touchpad, microphone, or any number of other input devices. For example, in one embodiment of the present invention, the user interface 625 includes a Cockpit Display of Traffic Information (CDTI) that displays information pertaining to aircraft traffic to the flight crew of an aircraft in conjunction with an overlay of a geographical region. This enhances a flight crew's situational awareness by allowing them to visually locate aircraft and other hazards that could cause a collision.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
   transmitting a Mode S interrogation;
   receiving a response from an aircraft that has received the Mode S interrogation;
   determining a range to the aircraft based on a time period between transmitting the Mode S interrogation and receiving the response;
   requesting information from one or more data sources, wherein the requesting includes specifying that the information should only be provided by the one or more data sources if the aircraft is within a predetermined volume;
   receiving the information from the one or more data sources; and
   determining at least one of a bearing to the aircraft and a position of the aircraft using the determined range and the information from the one or more data sources.

2. The method of claim 1, wherein the information from the one or more data sources includes at least one of:
   a range between the aircraft and one or more of the data sources;
   a bearing to the aircraft from one or more of the data sources;
   a position of one or more of the data sources;
   a velocity of one or more of the data sources; and
   an identifier for one or more of the data sources.

3. The method of claim 1, further comprising displaying the position of the aircraft in conjunction with a map of a geographical region through a Cockpit Display of Traffic Information (CDTI).

4. The method of claim 1, wherein the predetermined volume is bounded by at least one dimension measured from at least one of:
   a distance from a vehicle;
   a distance from the one or more data sources;
   a distance from a fixed geographical location; and
   combinations thereof.

5. The method of claim 1, wherein determining the position of the aircraft is further based on the determined bearing.

6. The method of claim 1, wherein determining at least one of the bearing to the aircraft and the position of the aircraft is based on one or more geographical features.

7. The method of claim 1, further comprising:
   transmitting a second Mode S interrogation;
   receiving a second response from the aircraft that has received the second Mode S interrogation;
   determining a second range to the aircraft based on a second time period between transmitting the second Mode S interrogation and receiving the second response; and
   determining at least one of a velocity direction of the aircraft and a velocity magnitude of the aircraft based on the determined range and the second determined range.

8. A system comprising:
   a processor;
   a Mode S transceiver;
   a data transceiver; and
   a memory coupled to the processor and storing instructions that, when executed by the processor, cause the processor to:
   transmit a Mode S interrogation using the Mode S transceiver;
   receive a response through the Mode S transceiver from an aircraft that has received the Mode S interrogation;
   determine a range to the aircraft based on a time period between transmitting the Mode S interrogation and receiving the response;
   request information from one or more data sources, wherein the requesting includes specifying that the information should only be provided by the one or more data sources if the aircraft is within a predetermined volume;
   receive the information from the one or more data sources through the data transceiver; and
   determine at least one of a bearing to the aircraft and a position of the aircraft using the determined range and the information from the one or more data sources.

9. The system of claim 8, further comprising a user interface, wherein the memory further stores instructions that, when executed by the processor, cause the processor to describe the position of the aircraft to a user through the user interface.

10. The system of claim 9, wherein the user interface includes a Cockpit Display of Traffic Information (CDTI) and the position of the aircraft is displayed in conjunction with a map of a geographical region.

11. The system of claim 9, wherein the memory further stores instructions that, when executed by the processor, cause the processor to:
    determine whether the aircraft poses a threat to a vehicle coupled to the system; and
    issue an alert to the user through the user interface when it is determined that the aircraft poses a threat to the vehicle.

12. The system of claim 8, wherein the memory further stores instructions that, when executed by the processor, cause the processor to:
    transmit a second Mode S interrogation using the Mode S transceiver;
    receive a second response through the Mode S transceiver from the aircraft that has received the second Mode S interrogation;
    determine a second range to the aircraft based on a time period between transmitting the second Mode S interrogation and receiving the second response;
    determine at least one of a velocity direction of the aircraft and a velocity magnitude of the aircraft based on the determined range and the second determined range.

* * * * *